United States Patent
Hintsala (10) Patent No.: US 10,678,674 B2
(45) Date of Patent: Jun. 9, 2020

(54) WIRELESS DEBUGGING

(71) Applicant: Silicon Laboratories Inc., Austin, TX (US)

(72) Inventor: Lauri Mikael Hintsala, Jokikunta (FI)

(73) Assignee: Silicon Laboratories, Inc., Austin, TX (US)

( * ) Notice: Subject to any disclaimer, the term of this patent is extended or adjusted under 35 U.S.C. 154(b) by 10 days.

(21) Appl. No.: 15/623,761

(22) Filed: Jun. 15, 2017

(65) Prior Publication Data

US 2018/0365130 A1   Dec. 20, 2018

(51) Int. Cl.
*H04L 29/06* (2006.01)
*H04L 29/08* (2006.01)
*G06F 15/16* (2006.01)
*H04L 12/24* (2006.01)
*G06F 11/36* (2006.01)

(52) U.S. Cl.
CPC ...... *G06F 11/3664* (2013.01); *G06F 11/3656* (2013.01)

(58) Field of Classification Search
CPC ......... G06F 11/30–3696; G06F 16/951; G06F 21/6227; G06F 19/3418; G06F 9/541; G06F 9/542; A61B 5/0533; A61B 5/165; H04L 63/0236; H04L 63/0227; H04L 63/0428; H04L 63/1441; H04L 67/34; H04L 67/10; H04L 67/327; H04L 45/74; H04L 45/586; H04L 47/24; H04L 69/32; H04L 41/0803; H04L 41/22; H04L 67/12; H04L 69/18; H04L 69/161; H04L 69/16; H04L 69/12; H04L 12/4633; H04L 29/06; H04L 51/066; H04L 51/36; H04L 51/16; G16H 50/20

See application file for complete search history.

(56) References Cited

U.S. PATENT DOCUMENTS

| | | | |
|---|---|---|---|
| 7,665,002 B1 * | 2/2010 | White | G01R 31/31705 714/727 |
| 9,588,870 B2 * | 3/2017 | Marron | G06F 11/362 |
| 9,995,789 B2 * | 6/2018 | Dewan | G01R 31/3177 |

(Continued)

OTHER PUBLICATIONS

Yiu, Joseph, "The Definitive Guide to the ARM Cortex-M3, 2nd Edition," pp. 248-250, https://www.eecs.umich.edu/courses/eecs373/labs/refs/M3%20Guide.pdf, retrieved Jan. 21, 2019. (Year: 2010).*

(Continued)

*Primary Examiner* — Thuy Dao
(74) *Attorney, Agent, or Firm* — Nield, Lemack & Frame, LLC (57) ABSTRACT

A novel system and method for remotely debugging a network device is disclosed. A debug system is used to transmit debug commands over a network to the network device. The network device interprets the debug commands. The processing unit on the network device includes a special debugging mode where it is able to perform special debug operations. This special debugging mode operates at a priority that is lower than that of the network interface so that the network device can still receive network packets while being debugged. The network device also has the ability to generate responses to the debug commands in some embodiments. The concept of wireless debugging can also be applied to multi-core processors as well.

20 Claims, 7 Drawing Sheets

(56) References Cited

U.S. PATENT DOCUMENTS

| | | | | |
|---|---|---|---|---|
| 10,243,809 | B2* | 3/2019 | Raman | G06F 11/3006 |
| 2006/0048006 | A1* | 3/2006 | Lou | G01R 31/31705 |
| | | | | 714/25 |
| 2006/0059286 | A1* | 3/2006 | Bertone | G06F 9/30014 |
| | | | | 710/260 |
| 2007/0250819 | A1* | 10/2007 | Fjeldstad | G06F 11/3664 |
| | | | | 717/129 |
| 2008/0295114 | A1* | 11/2008 | Argade | G06F 9/485 |
| | | | | 719/320 |
| 2013/0346814 | A1* | 12/2013 | Zadigian | G01R 31/28 |
| | | | | 714/724 |
| 2016/0092327 | A1* | 3/2016 | Kang | G06F 11/36 |
| | | | | 714/33 |
| 2017/0176524 | A1* | 6/2017 | Dewan | G01R 31/3177 |
| 2018/0034793 | A1* | 2/2018 | Kibalo | G06F 21/575 |
| 2018/0322083 | A1* | 11/2018 | Kim | G06F 13/1605 |

OTHER PUBLICATIONS

Anonymous, "ARM Cortex-A Series: Programmer's Guid for ARMv8-A, Version 1.0," pp. 14:1-20, 18:1-16, https://static.docs.arm.com/den0024/a/DEN0024A_v8_architecture_PG.pdf?_ga=2.94739164.1318857270.1548354289-1669224041.1548041707, retrieved Jan. 21, 2019. (Year: 2015).*

ARM CoreSight DAP-Lite2, a Technical Reference Manual, ARM Limited, 44 pages (Year: 2016).*

Wang et al., Automated and distributed protocol testing and debugging for wireless ad-hoc networks, 4 pages (Year: 2011).*

CoreSight Components Technical Reference Manual, "2.1. About the Debug Access Port," ARM, accessed Sep. 12, 2017, http://infocenter.arm.com/help/index.jsp?topic=/com.arm.doc.ddi0314h/Babdadfc.html.

CoreSight Technology System Design Guide, "1.2.1. Debug Access," ARM, accessed Sep. 12, 2017, http://infocenter.arm.com/help/index.jsp?topic=/com.arm.doc.dgi0012d/Cacgeecg.html.

ARM7TDMI Technical Reference Manual, "5.9. Monitor mode," ARM, accessed Sep. 12, 2017, http://infocenter.arm.com/help/index.jsp?topic=/com.arm.doc.ddi0210c/1901036.html.

Michael Dietz, Blogs—Nordic Developer Zone, "Monitor Mode Debugging—Revolutionize the way you debug BLE applications," Mar. 15, 2016.

"Monitor Mode Debugging," Segger Microcontroller Systems LLC, accessed Sep. 12, 2017, https://www.segger.com/products/debug-probes/j-link/technology/monitor-mode-debugging/.

* cited by examiner

WIRELESS DEBUGGING

This disclosure describes systems and methods for allowing wireless debugging of a remote device.

BACKGROUND

During the development of software, it is often helpful to be able to view the operation of that software on the device under test. In most embodiments, this is achieved by attaching an external device to the device under test. For example, a debug system may have a debugging application, which accesses the device under test using cables, test ports, or other mechanisms. For example, the device under test may include a debug port, which an external debug system may access. By attaching to this debug port, the external debug system may control the operation of the software executing on the device under test.

However, while this technique has been used successful for many years, it has limitations. For example, as devices get smaller, or are deployed in locations which are not easily accessible, the ability to physically attach cables to that device under test becomes more onerous, or even impossible.

Therefore, it would be beneficial if there were a system and method of performing all or most of the debug commands that are typically used without having to physically access the device under test. Further, it would be advantageous if this system could utilize a network connection that already exists on the device under test, such as a wireless network connection.

SUMMARY

A novel system and method for remotely debugging a network device is disclosed. A debug system is used to transmit debug commands over a network to the network device. The network device interprets the debug commands. The processing unit on the network device includes a special debugging mode where it is able to perform special debug operations. This special debugging mode operates at a priority that is lower than that of the network interface so that the network device can still receive network packets while being debugged. The network device also has the ability to generate responses to the debug commands in some embodiments. The concept of wireless debugging can also be applied to multi-core processors as well.

According to one embodiment, a method of debugging a network device is disclosed. The method comprises receiving a debug command at the network device, wherein the debug command is transmitted over a network and received by a network interface; using a processing unit on the network device to parse the debug command; entering a special debugging mode of the processing unit where the debug command may be performed; and executing the debug command while in the special debugging mode; wherein the special debugging mode operates at a priority lower than that of the network interface such that network packets are still received by the network device while the processing unit is in the special debugging mode. In certain embodiments, the processing unit is an ARM® Cortex® processor and the special debugging mode is Monitor Mode. In certain embodiments, the network comprises a wireless network.

According to another embodiment, a network device is disclosed. The network device comprises a network interface; a processing unit; a memory device, accessible by the processing unit, where the memory device contains instructions, which when executed by the processing unit, allow the network device to: receive a packet at the network device, wherein the packet is transmitted over a network and received by a network interface; parse the packet to determine if it is a debug command; if the packet is a debug command: parse the packet to determine the debug operation to be performed; cause the processing unit to enter a special debugging mode where the debug operation can be executed; and perform the debug operation while in the special debugging mode; and if the packet is not a debug command: place the packet on a receiver queue of the network protocol software.

According to another embodiment, a method of debugging a network device having a multi-core processor is disclosed. The method comprises receiving a packet at the network device, wherein the packet is transmitted over a network and received by a network interface; using a first processing unit of the multi-core processor on the network device to parse the packet to determine if it is a debug command; and if the packet is a debug packet, using the first processing unit of the multi-core processor to execute the debug command. In certain embodiments, the first processing unit executes the debug command on the second processing unit of the multi-core processor.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
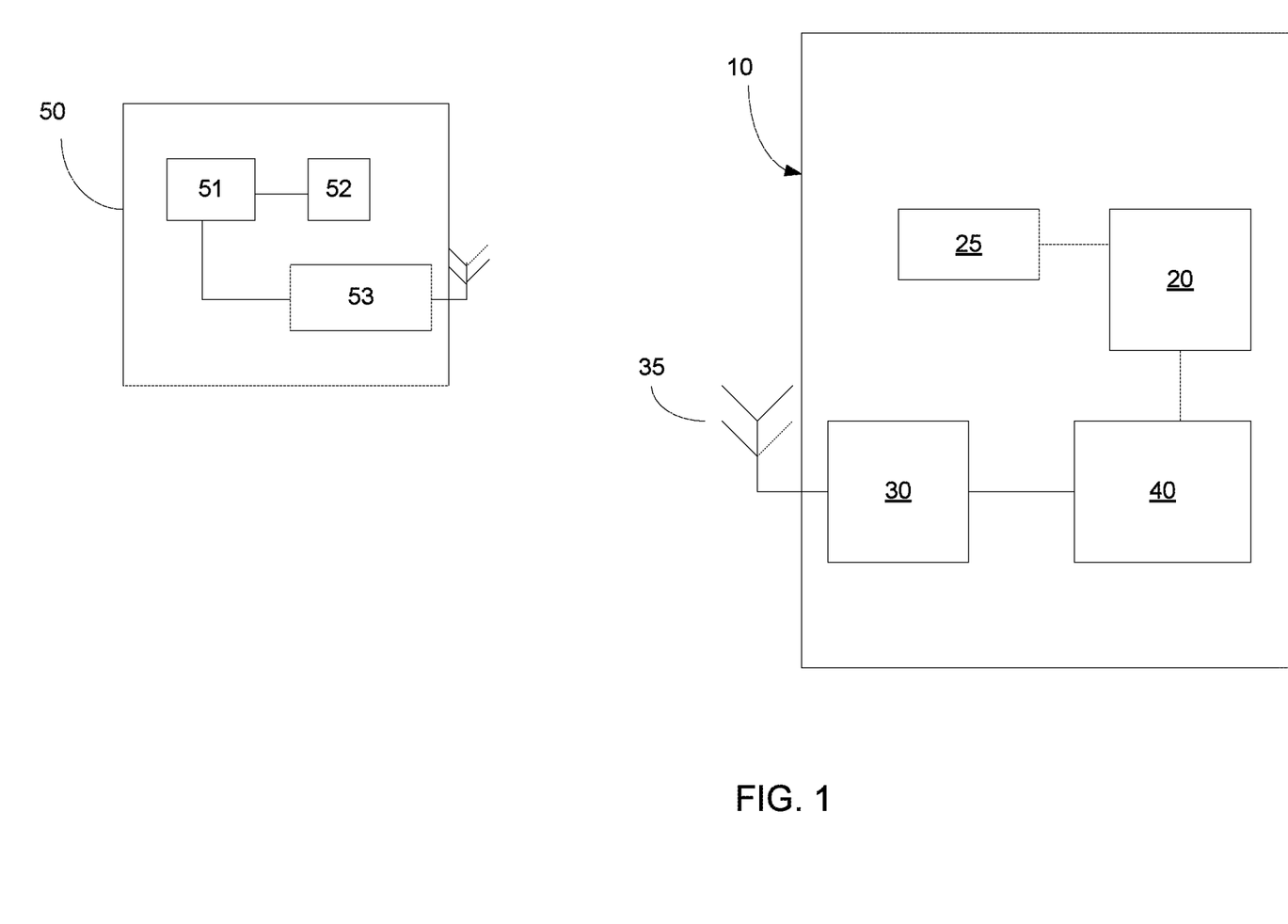
FIG. 1 is a block diagram of a network device according to one embodiment.

FIG. 1 shows a block diagram of a representative network device 10 and a debug computer 50.

The network device 10 has a processing unit 20 and an associated memory device 25. This memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The network device 10 also includes a wireless network interface 30, which may be a wireless interface including an antenna 35. The wireless network interface 30 may support any wireless network, including ZIGBEE®, Thread, BLU- ETOOTH®, Bluetooth Low Energy, a cellular protocol, such as 3G, GCM, CDMA, 4G, LTE, or other protocols.

The network device 10 may include a second memory device 40 in which data that is received by the wireless network interface 30, and data that is to be transmitted by the wireless network interface 30, is stored. This second memory device 40 is traditionally a volatile memory. The processing unit 20 has the ability to read and write the second memory device 40 so as to communicate with the other nodes in the network. Although not shown, the network device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection, via CD ROM, or by another mechanism. These instructions may be written in any programming language and the programming language is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the network device 10. The instructions contained on this second computer readable media may be downloaded onto the memory device 25 to allow execution of the instructions by the network device 10.

Figure 4:
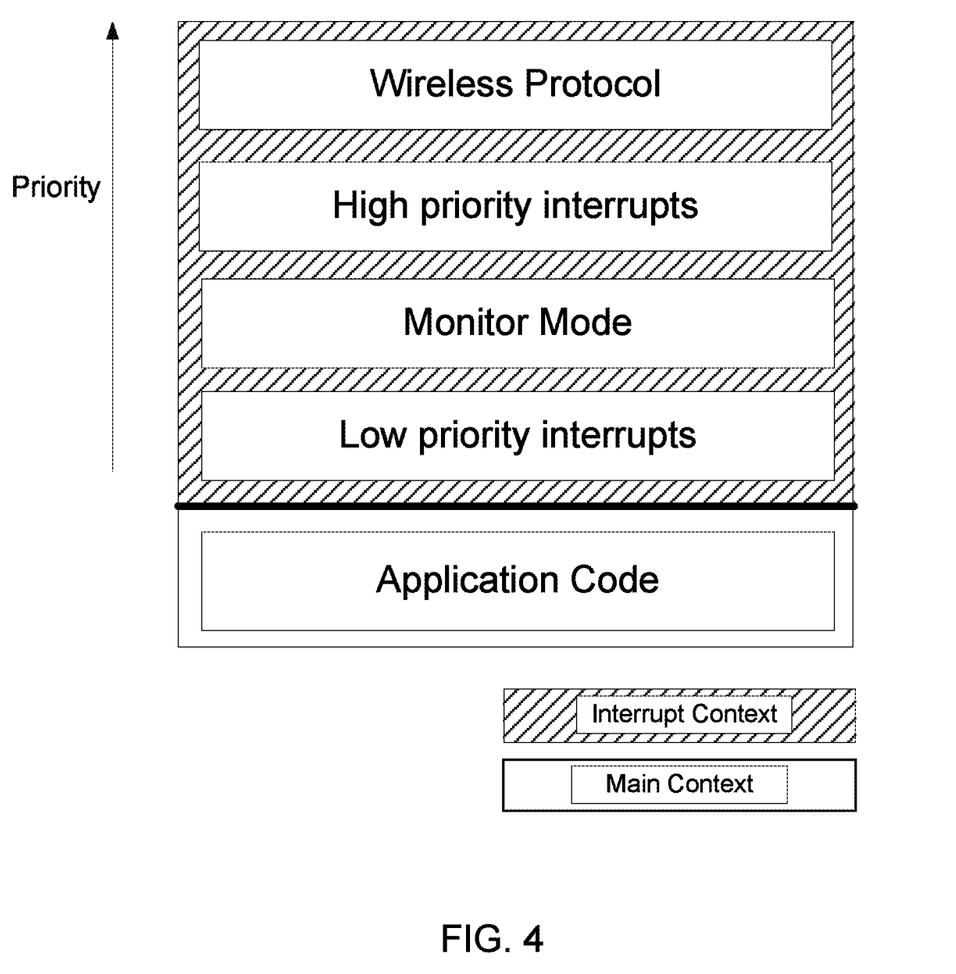
FIG. 4 shows the software architecture of the network device.

In certain embodiments, the processing unit 20 is an ARM® Cortex®-M4 processor. This processing unit 20 includes a special debugging mode, known as monitor mode. In traditional debugging modes, once a breakpoint is encountered, the processing unit is halted, stopping the execution of all instructions. However, in the present embodiment, in order to allow remote debugging to be operative, it is required that interrupts continue to be serviced, so that the wireless network connection is maintained. Monitor mode allows for this capability. In monitor mode, when a breakpoint is encountered, the processing unit 20 enters a Debug Monitor exception handler. This exception handler is essentially an interrupt service routine, serviced at a particular interrupt (IRQ) level. Any interrupts that have a higher IRQ level than the Debug Monitor exception handler are still serviced. However, any interrupts that have a lower IRQ Level are blocked. The Debug Monitor exception handler may comprise a short set of instructions that continuously loop. FIG. 4 shows an illustration of the priority of operations for the network device 10. As can be seen, the level of priority increases going up the stack. The application software, when executes in main context, operates at the lowest priority. All of the interrupts operate at interrupt context. The monitor mode is assigned a priority level that is less than the priority of the wireless protocol. As can be seen in FIG. 4, any interrupts that have higher priority than the monitor mode continue to operate. Any interrupts having lower priority and any applications that execute in main context are blocked by when monitor mode is executing.

The ARM® Cortex® processor has a Debug Access Port that allows access to various debug capabilities. These capabilities include the ability to set breakpoints, the ability to set watchpoints, the ability to read memory locations, the ability to read register locations and others. This Debug Access Port allows external debugger hardware to attach to the ARM® Cortex® processor. The present disclosure takes advantage of these built-in features of the processor, but does so in a unique way, without requiring a physical connection to the processing unit 20. In other words, rather than connecting a separate computer to the Debug Access Port of the ARM® Cortex® processor, the present system relies on code that is being executed by that ARM® Cortex® processor to implement the debug commands. This code has the ability to access the hardware directly, in essentially the same way that it would be accessed using the Debug Access Port. Throughout this disclosure, this concept is referred to as a Software Debug Access Port. Specifically, the Software Debug Access Port refers to the use of code, executing on this processing unit, to access hardware registers in the same manner as would be done using the Debug Access Port.

While the ARM® Cortex®-M4 processor is specifically described above, any processing unit having this functionality may be employed in the present system.

While the processing unit 20, the memory device 25, the wireless network interface 30 and the second memory device 40 are shown in FIG. 1 as separate components, it is understood that some or all of these components may be integrated into a single electronic component. In certain embodiments, the components shown in FIG. 1 are all incorporated into a single chip solution. Rather, FIG. 1 is used to illustrate the functionality of the network device 10, not its physical configuration.

The debug computer 50 is used to debug the network device 10. The debug computer 50 comprises a processing unit 51 with an associated memory 52. The memory 52 may be a volatile memory, such as DRAM, or may be non-volatile, such as FLASH memory, magnetic storage or optical storage. The memory 52 contains instructions and programs, which when executed by the processing unit 51, enable the debug computer 50 to perform the functions described herein. The debug computer 50 also comprises a wireless network interface 53, which utilizes the same protocol as the wireless network interface 30 of the network device 10. The debug computer 50 can be any suitable personal computer with a wireless interface. Additionally, the debug computer 50 may be a mobile computing device, such as a laptop computer, tablet, smart phone or other device.

Figure 2:
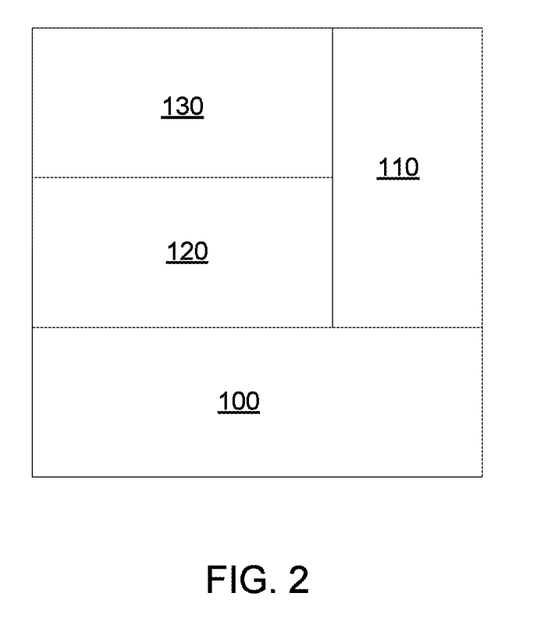
FIG. 2 shows the software architecture of the network device of FIG. 1 in one implementation.

FIG. 2 shows the software architecture of the network device 10. At the lowest level is the hardware layer 100. The hardware layer 100 includes all of the hardware registers of the network device 10, including its wireless network interface 30 and its processing unit 20. The wireless network stack 120 resides on top of the hardware layer 100. In some embodiments, this wireless network stack 120 may be a BLUETOOTH® stack, although other network stacks, such as a ZIGBEE® stack may be used. The wireless network stack 120 is used to parse incoming packets and communicate with the wireless network interface 30. The application layer 130 resides on top of the wireless network stack 120. The wireless network stack 120 and the application layer 130 implement the operational code for the network device 10. In other words, it is these layers that allow the network device 10 to perform its normal operating functions. FIG. 2 also shows debugger code 110. The debugger code 110 also resides on top of the hardware layer 100, such that it can directly access the hardware registers and memory of the network device 10. Note that the debugger code 110 sits next to the wireless network stack 120 and the application layer 130. This is intended to illustrate that the debugger code 110 is separate from these layers and does not interfere with or modify their functionality. Further, this illustrates that the debugger code 110 interfaces with the wireless network stack 120, as described in more detail below.

Figure 3:
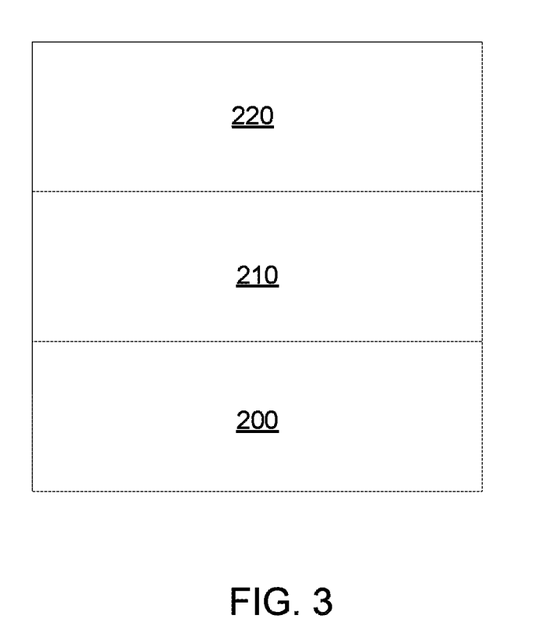
FIG. 3 illustrates the software architecture of the debug computer according to one embodiment.

FIG. 3 shows the software architecture of the debug computer 50. The hardware layer 200 includes all of the hardware registers of the debug computer 50, including its wireless network interface. A debug layer 210 resides on top of the hardware layer 200. This debug layer 210 allows for the communication with the remote network device 10. In one embodiment, a debug server, such as GNU Debugger (GDB) may be used. In one embodiment, the GDB software was modified to allow wireless commands to be transmitted. Further, a simple protocol, which is described in more detail below, may also be added to the GDB software. A debug application 220 is then disposed on top of the debug layer 210. The debug application 220 has the user interface which allows the user to see the execution of the remote network device 10, to set breakpoints and watchpoints, and to issue other debug commands. In one particular embodiment, the debug application 220 may be GDB or may be an application known as Eclipse. Of course, other debug applications may also be used.

The configuration of FIG. 1 allows for almost all debug capabilities, including breakpoints, watchpoints, code stepping, core register reading and writing, memory reading and writing, access to memory while the code is running, call stack analysis, debug prints and system tracing.

As described above, the debug computer 50, rather than using a serial port or another physical connection, now transmits wireless debug commands to the network device 10 using a wireless network interface 53. Consequently, the debug layer 210 is customized for this embodiment. Specifically, when a debug command is received from the debug application 220, the debug layer 210 must create a wireless packet that is then transmitted to the network device 10. Thus, the debug layer 210 includes a simple protocol that is used by the debug layer 210 and the debugger code 110. Each debug command has a vendor unique command that corresponds to that debug command. The simple protocol also allows the exchange of additional information or arguments, such as breakpoint address, register location, and register contents. In certain embodiments, this additional information is contained in the payload of the vendor unique command. For example, there may be a vendor unique command that corresponds to "set a breakpoint". The payload for this debug command may comprise the address at which the breakpoint is to be set. Each debug command may be processed in this manner. In another embodiment, a single vendor unique command is used to signify that debug information is being transmitted. In this embodiment, the payload would include the debug command and any arguments needed for that debug command.

Figure 5:
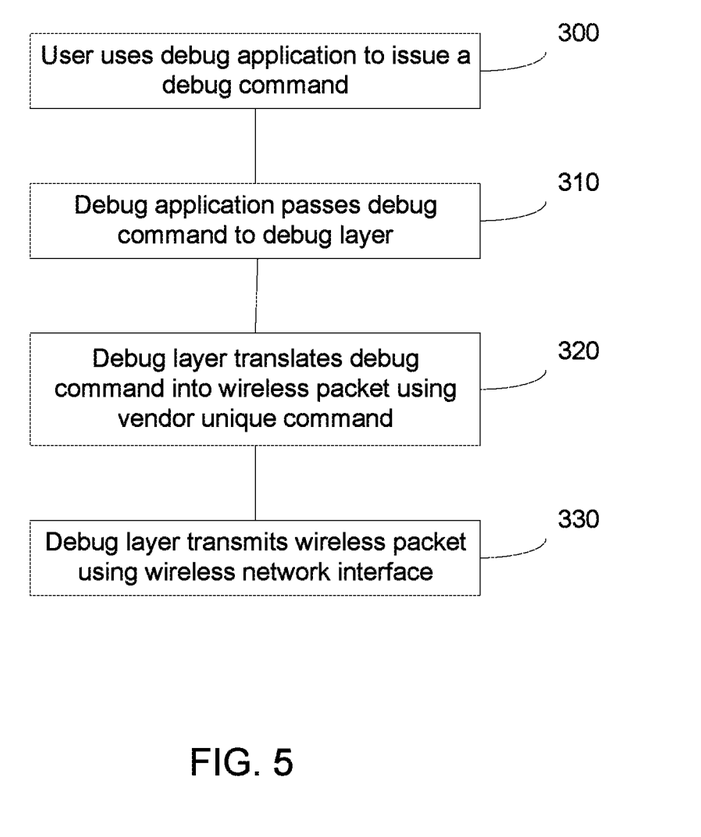
FIG. 5 is a flowchart illustrating the operation of the debug computer.

FIG. 5 shows the operation of the debug computer 50. First, as shown in Box 300, the user enters a debug command into the debug application 220. The debug application 220 then passes this debug command and any arguments to the debug layer 210, as shown in Box 310. The debug layer 210 then converts the debug command into a wireless packet using a vendor unique command, as shown in Box 320. The wireless packet may also contain any arguments that need to accompany the debug command. The debug layer 210 then transmits the wireless packet to the network device 10 using the wireless network interface 53, as shown in Box 330. When responses are received from the network device 10, this sequence is executed in the opposite direction. Specifically, the debug layer 210 receives the wireless packet from the hardware layer 200. It disassembles the wireless packet and returns the required information to the debug application 220. The debug application 220 then displays this information to the user.

Turning next to the network device 10, the debugger code 110 on the network device 10 is written to implement the same simple protocol. Wireless packets that are transmitted to the network device 10 are handled by the wireless network stack 120. Since the wireless protocol has higher priority than the monitor mode, these interrupts continue to be serviced. The wireless network stack 120 then parses the incoming wireless packet. If it is a normal operating packet, it is placed on the wireless protocol software's receiver queue. If it is a debug command, as determined by the vendor unique command, the wireless network stack 120 passes the packet to the debugger code 110. The debugger code 110 then processes the wireless packet. That processing comprises parsing the wireless packet to determine the debug command and arguments that are being passed to it. Once the debugger code 110 determines the debug command and arguments, it executes the requested command using the software debug access port described above. If a response is required, the debugger code 110 creates a wireless packet to transmit back to the debug computer 50 and passes the wireless packet to the wireless network stack 120 to transmit to the debug computer 50.

Figure 6:
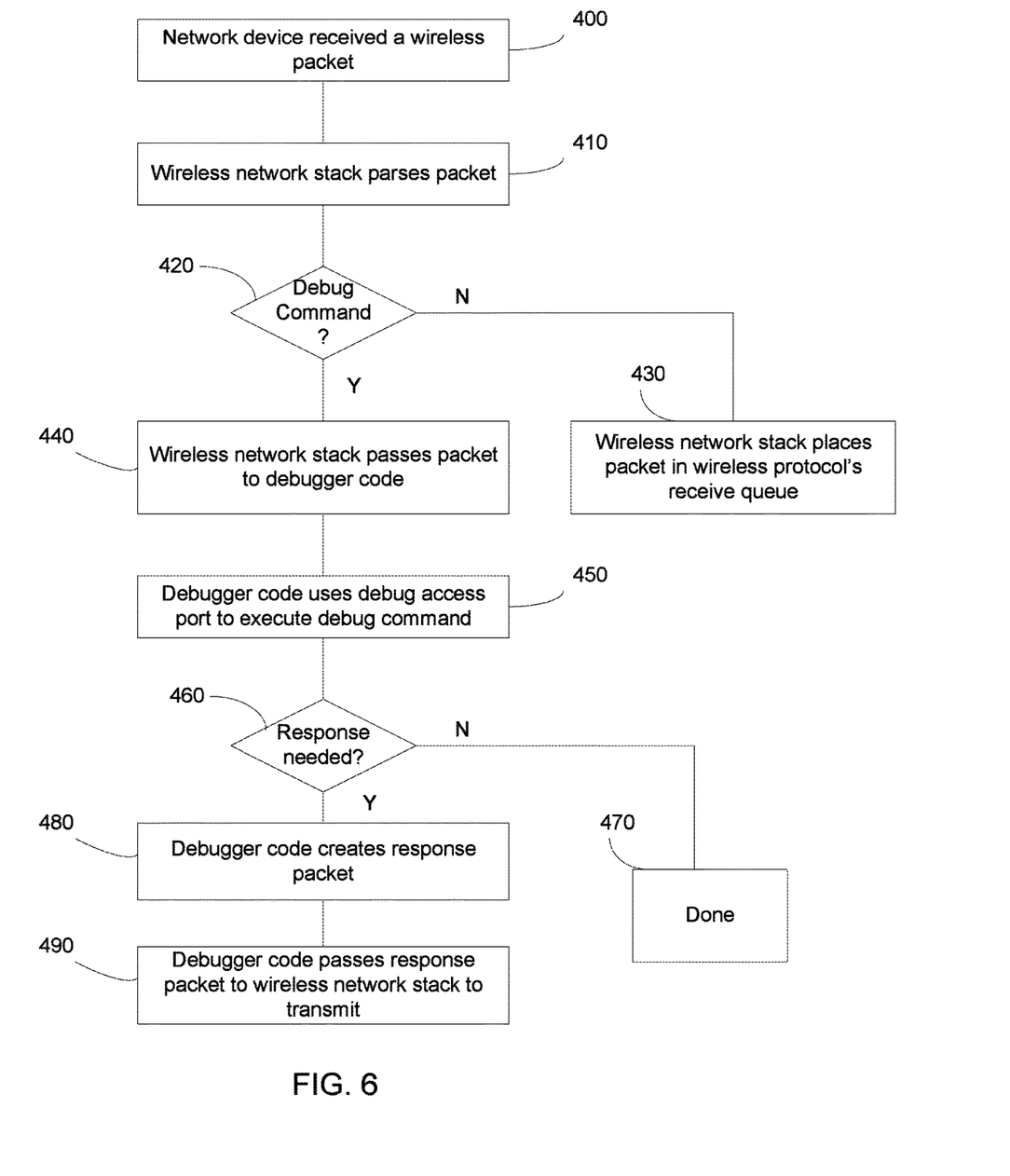
FIG. 6 is a flowchart illustrating the operation of the network device.

FIG. 6 shows the operation of the network device 10 in debug mode. First, as shown in Box 400, the network device 10 receives a wireless packet. This wireless packet is parsed by the wireless network stack 120, as shown in Box 410. The wireless network stack 120 determines whether this is a normal transmission or a debug command, as shown in Box 420. If the wireless packet is a normal transmission, the wireless network stack 120 places the received packet on the receive queue, as shown in Box 430. If the wireless packet is a debug command, the wireless network stack 120 passes the packet to the debugger code 110, as shown in Box 440. The debugger code 110 then uses the software debug access port of the processing unit 20 to execute the debug command. If the debug command does not require a response, the transaction is done, as shown in Box 470. If a response is required, the debugger code 110 creates the response packet, as shown in Box 480. The response packet is then passed to the wireless network stack 120, which transmits the response packet using the network interface, as shown in Box 490.

Having described to basic operation of the system, several examples will be described.

In one example, a BREAK command is given by the user. Prior to the issuance of the BREAK command, the network device 10 is executing application code, running in the main context (see FIG. 4). When the BREAK command is issued by the user, a debug command is passed to the debug layer 210, transmitted to the network device 10, and executed by the debugger code 110. This causes the processing unit 20 to enter the monitor mode (see FIG. 4). Thus, application and low priority interrupts are blocked, but higher prior interrupts, such as wireless protocol interrupts are handled. While in this state, the processing unit 20 is executing a code loop in the monitor mode handler.

While in the halted state, the user may wish to set a breakpoint. Again, the debug command is passed to the debug layer 210 and transmitted wirelessly to the network device 10. Since wireless protocol interrupts are still serviced while the processing unit 20 is in monitor mode, the debug command is received by the network device 10. The debugger code 110 uses the software debug access port of the processing unit 20 to set the desired breakpoint. At this point, the system is still in the monitor mode.

After setting the breakpoint, the application resident on the network device 10 may be allowed to execute again. This may be done explicitly, such as through the use of a CONTINUE command. Alternatively, it may be done implicitly, where the processing unit 20 begins executing the application code after the breakpoint is set. In either scenario, the monitor mode exception handler is exited, such that the processing unit 20 returns to normal operating mode, running in main context (see FIG. 4). This application will continue to execute until either another debug command is given, or the breakpoint is encountered.

In certain embodiments, the debugger code 110 may notify the debug computer 50 when the breakpoint is encountered. In other embodiments, the debug layer 210 may poll the network device 10 to determine when the processing unit 20 is in monitor mode. Once the breakpoint has been encountered, the processing unit 20 is in monitor mode, where the application and lower priority interrupts are blocked.

While in this state, the user may interrogate the state of any register or memory location. Further, the user may single step through the application executing on the network device 10, if desired. To step, the processing unit 20 exits the monitor mode for exactly one instruction. After that instruction is executed, the monitor mode exception is activated again and the application is halted.

Thus, the user can remotely debug the network device 10 without needing to attach any cables, wires or other physical connections to the network device 10. This is possible because the debugger code 110 executing on the network device 10 uses the software debug access port. This is in contrast to traditional systems, where a separate device is physically connected to the Debug Access Port.

Thus, unlike other traditional debug environments, the present system and method uses code that is executed on the network device 10 to utilize the software debug access port of the processing unit 20. In this way, there is no need to connect an external device to the Debug Access Port of the processing unit 20. Furthermore, while the above disclosure describes the use of remote debugging in the context of a wireless network, this technique could be performed using a wired network connection, such as Ethernet.

Figure 7:
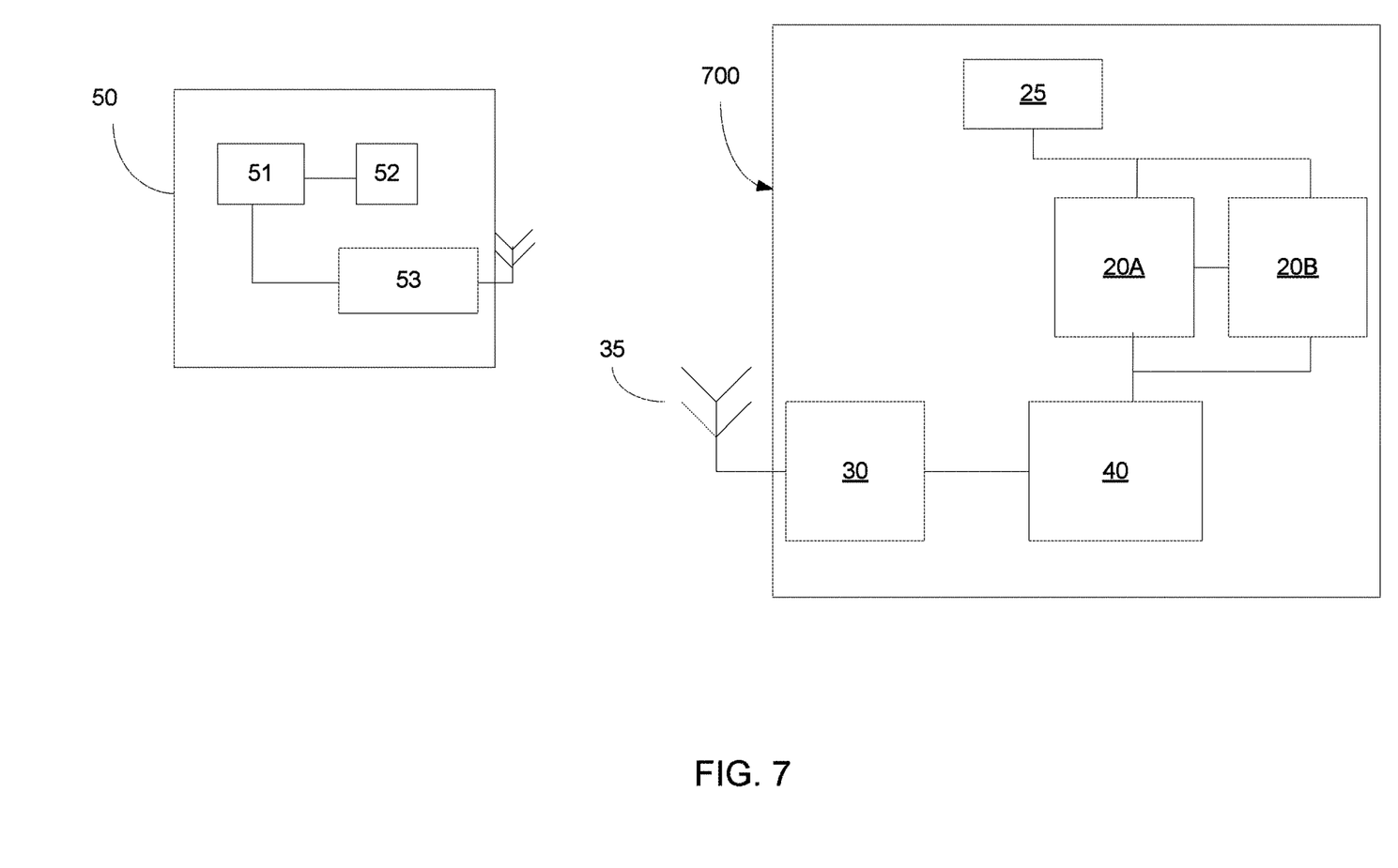
FIG. 7 is a block diagram of a network device according to another embodiment.

While the above disclosure describes the remote debugging of the single processing unit of a network device using a remote debug computer, other embodiments are also possible. For example, in certain embodiments, the processing unit 20 may be a multi-core processing unit. In other words, the processing unit 20 may comprises two or more cores that are capable of executing instructions. FIG. 7 shows this configuration. Network device 700 is similar to network device 10 of FIG. 1, except this network device 700 comprises a multi-core processing unit, including a first processing unit 20A and a second processing unit 20B.

Figure 8A:
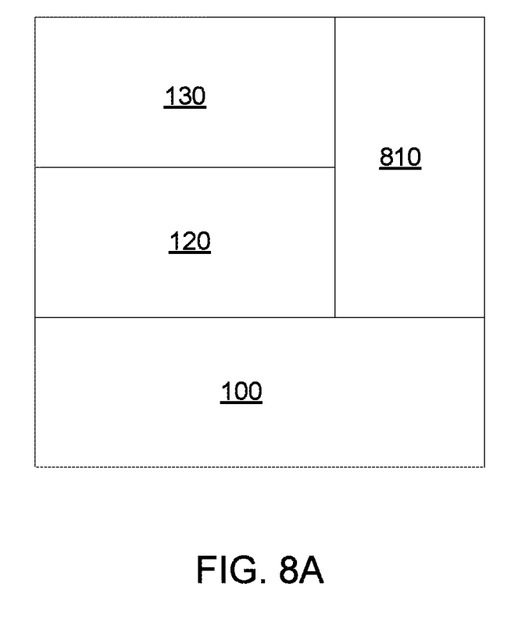
FIGS. 8A-8B show the software architecture of the processing units in the network device of FIG. 7.

In this embodiment, the wireless communication occurs between the debug computer 50 and the first processing unit 20A. Thus, the operation of the debug application 220 and debug layer 210 of the debug computer 50 are as described above. FIG. 8A shows the software architecture of first processing unit 20A, while FIG. 8B shows the software architecture of second processing unit 20B.

Figure 8B:
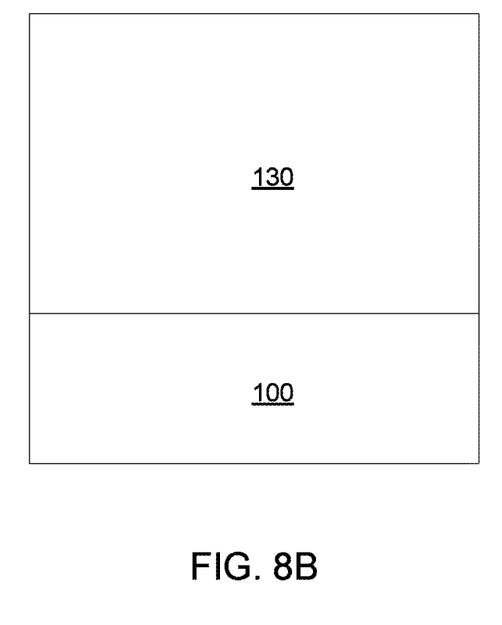

The software architecture of the second processing unit 20B may be as shown in FIG. 8B. In other words, the second processing unit 20B may have hardware layer 100, and execute an application layer 130. In many embodiments, only one wireless network stack 120 is executed in the multi-core system. Thus, a network stack is not shown in FIG. 8B. Further, the second processing unit 20B may not execute any debug code. In contrast, the first processing unit 20A may include wireless network stack 120 and debugger code 810. Unlike the embodiment of FIG. 1, the debugger code 810 does not need to operate in monitor mode, since the first processing unit 20A is not being debugged. Rather, the vendor unique commands that are transmitted by the debug computer 50 to the first processing unit 20A instruct the debugger code 810 to perform the requested debug action on the second processing unit 20B. For example, the ARM® Cortex®-M4 has the capability for one core to debug a second core.

In this way, the second processing unit 20B can be halted, since the first processing unit 20A is responsible for maintaining the wireless network. Thus, the second processing unit 20B does not need to operate in Monitor Mode. In other words, the first processing unit 20A controls the second processing unit 20B in much the same way as would be done if the Debug Access Port were used with an external debug computer.

In certain embodiments, the debug command may be a command that the first processing unit 20A can execute without the second processing unit 20B. For example, if the debug command is a request to read or write a memory location that is accessible to both the first processing unit 20A and the second processing unit 20B, the first processing unit 20A can complete this debug command.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of debugging a network device, comprising:
receiving a packet at the network device, wherein the packet is transmitted over a network and received by a network interface;
using a network stack in communication with the network interface to parse all incoming network packets and determine whether an incoming network packet is a debug command;
using a processing unit on the network device to parse the debug command;
entering a special debugging mode of the processing unit where the debug command may be performed; and
executing the debug command while in the special debugging mode, wherein, while in the special debugging mode, the processing unit accesses hardware registers using a Software Debug Access Port;
wherein the special debugging mode operates at a priority lower than that of the network stack such that network packets are still received and parsed by the network stack while the processing unit is in the special debugging mode; and wherein the processing unit is an ARM® Cortex® processor and the special debugging mode is Monitor Mode.

2. The method of claim 1, wherein the network comprises a wireless network.

3. The method of claim 1, wherein the network stack moves the packet to the receive queue of network protocol software if the packet is not a debug command.

4. The method of claim 1, wherein the network stack passes the packet to debugging code, resident on the network device, if the packet is a debug command.

5. The method of claim 1, further comprising:
while in the special debugging mode:
receiving a packet transmitted over the network by the network interface;
parsing the packet;
determining whether the packet is a second debug command;
performing a second debug operation if the packet is a second debug command; and
moving the packet to the receive queue of network protocol software if the packet is not a second debug command.

6. The method of claim 1, further comprising:
using the processing unit to generate a response to the debug command; and
transmitting the response over the network using the network interface.

7. A network device, comprising:
a network interface;
a processing unit;
a memory device, accessible by the processing unit, where the memory device contains a network stack and instructions, which when executed by the processing unit, allow the network device to:
receive a packet at the network device, wherein the packet is transmitted over a network and received by the network interface;
parse the packet using the network stack to determine if it is a debug command;
if the packet is a debug command:
parse the packet to determine a debug operation to be performed;
cause the processing unit to enter a special debugging mode where the debug operation can be executed; and
perform the debug operation while in the special debugging mode, wherein, while in the special debugging mode, the processing unit accesses hardware registers using a Software Debug Access Port; and
if the packet is not a debug command:
place the packet on a receiver queue of network protocol software; and
wherein the special debugging mode operates at a priority lower than that of the network stack.

8. The network device of claim 7, wherein the network interface comprises a wireless network interface.

9. The network device of claim 7, wherein the processing unit comprises an ARM® Cortex® processing unit.

10. The network device of claim 9, wherein the special debugging mode is Monitor Mode.

11. The network device of claim 7, wherein the instructions comprise a debugging code and an application layer, wherein the debugging code performs the debug operation.

12. The network device of claim 7, wherein the processing unit is able to receive a packet that is not a debug command from the network interface while in the special debugging mode.

13. The network device of claim 7, wherein the instructions, when executed by the processing unit, further allow the network device to:
use the processing unit to generate a response to the debug command; and
transmit the response over the network using the network interface.

14. A non-transitory computer readable storage medium, comprising instructions, which when executed by a processing unit disposed in a network device, enable the network device to:
receive a packet at the network device, wherein the packet is transmitted over a network;
parse the packet using a network stack to determine if it is a debug command;
if the packet is a debug command:
parse the packet to determine a debug operation to be performed;
cause the processing unit to enter a special debugging mode where the debug operation can be executed; and
perform the debug operation while in the special debugging mode, wherein, while in the special debugging mode, the processing unit accesses hardware registers using a Software Debug Access Port; and
if the packet is not a debug command:
place the packet on a receiver queue of network protocol software; and
wherein the special debugging mode operates at a priority lower than that of the network stack.

15. The non-transitory computer readable storage medium of claim 14, wherein the network comprises a wireless network.

16. The non-transitory computer readable storage medium of claim 14, wherein the processing unit comprises an ARM® Cortex® processing unit.

17. The non-transitory computer readable storage medium of claim 16, wherein the special debugging mode is Monitor Mode.

18. The non-transitory computer readable storage medium of claim 14, wherein the instructions comprise a debugging code and an application layer, wherein the debugging code performs the debug operation.

19. The non-transitory computer readable storage medium of claim 14, wherein, because the special debugging mode operates at a priority lower than that of the network stack, the processing unit is able to receive a packet that is not a debug command from the network interface while in the special debugging mode.

20. The non-transitory computer readable storage medium of claim 14, wherein the instructions, when executed by the processing unit, further allow the network device to:
use the processing unit to generate a response to the debug command; and
transmit the response over the network.

* * * * *